US010311315B2

(12) United States Patent
Drazan et al.

(10) Patent No.: US 10,311,315 B2
(45) Date of Patent: Jun. 4, 2019

(54) CAMERA ARRAY SYSTEM AND METHOD TO DETECT A LOAD STATUS OF A SEMI-TRAILER TRUCK

(71) Applicant: Spireon, Inc., Knoxville, TN (US)

(72) Inventors: Jeffrey M. Drazan, Woodside, CA (US); James Brady, Cardiff-by-the-Sea, CA (US); Jim Epler, Irvine, CA (US)

( * ) Notice: Subject to any disclaimer, the term of this patent is extended or adjusted under 35 U.S.C. 154(b) by 219 days.

(21) Appl. No.: 15/491,040

(22) Filed: Apr. 19, 2017

(65) Prior Publication Data

US 2017/0262717 A1 Sep. 14, 2017

Related U.S. Application Data

(63) Continuation of application No. 14/682,086, filed on Apr. 8, 2015, now abandoned.

(51) Int. Cl.
| | |
|---|---|
| *H04N 5/225* | (2006.01) |
| *G06K 9/00* | (2006.01) |
| *H04N 7/18* | (2006.01) |
| *B60R 1/00* | (2006.01) |
| *B60R 11/04* | (2006.01) |
| *G06K 9/20* | (2006.01) |
| *G06K 9/62* | (2006.01) |
| *H04L 29/08* | (2006.01) |
| *H04N 5/232* | (2006.01) |
| *H04N 5/247* | (2006.01) |

(Continued)

(52) U.S. Cl.
CPC ............ *G06K 9/00832* (2013.01); *B60R 1/00* (2013.01); *B60R 11/04* (2013.01); *G06K 9/209* (2013.01); *G06K 9/6215* (2013.01); *H04L 67/02* (2013.01); *H04N 5/2256* (2013.01); *H04N 5/23232* (2013.01); *H04N 5/23293* (2013.01); *H04N 5/247* (2013.01); *H04N 7/181* (2013.01); *H04N 7/188* (2013.01); *B60R 2011/0003* (2013.01); *B60R 2300/105* (2013.01); *B60R 2300/406* (2013.01); *B60R 2300/8006* (2013.01); *B60R 2300/8046* (2013.01); *G01G 19/08* (2013.01)

(58) Field of Classification Search
CPC .. G06K 9/00832; G06K 9/6215; G06K 9/209; H04N 7/181; H04N 5/2256; H04N 7/188; H04N 5/23293; H04N 5/23232
See application file for complete search history.

(56) References Cited

U.S. PATENT DOCUMENTS

| | | | |
|---|---|---|---|
| 2007/0013779 A1* | 1/2007 | Gin | .................. G08B 13/19626 348/159 |
| 2015/0172518 A1* | 6/2015 | Lucas | .................. H04N 5/2251 348/148 |

* cited by examiner

*Primary Examiner* — Jonathan R Messmore
(74) *Attorney, Agent, or Firm* — Luedeka Neely Group, P.C.

(57) ABSTRACT

Disclosed are a method, a device and/or a system of utilizing a camera array system to detect a load status of a semi-trailer truck. A sensor array is affixed to a surface of a trailer of the semi-trailer truck to automatically determine whether a cargo area of the semi-trailer truck is occupied. A set of cameras of the sensor array have each camera embedded in individual recesses of the sensor array. The cargo area is illuminated using at least one light source of the sensor array. A memory and a processor associated with the sensor array are configured to store one baseline image of the cargo area of the trailer in an empty state. The processor is configured to detect a triggering event. The processor determines a cargo status based upon a difference between the current image and the baseline image, and sends the cargo status to a dispatcher.

22 Claims, 10 Drawing Sheets

(51) Int. Cl.
*G01G 19/08* (2006.01)
*B60R 11/00* (2006.01)

| DISPATCHER 134 | TRAILER 102 | SET OF CAMERAS 112 | BASELINE IMAGE DISTORTION 502 | TRIGGERING EVENT 206 | DISTORTION IN CURRENT IMAGE 504 | CARGO STATUS 124 |
|---|---|---|---|---|---|---|
| DISPATCHER A | TRAILER 1 | CAMERA A | None | Trailer Opening Event | Yes | </= 20% Full |
| | | CAMERA B | None | | No | |
| | | CAMERA C | None | | No | |
| | | CAMERA D | None | | No | |
| | TRAILER 2 | CAMERA A | None | Velocity Based Event | Yes | </= 60% Full |
| | | CAMERA B | None | | Yes | |
| | | CAMERA C | None | | Yes | |
| | | CAMERA D | None | | No | |
| ⋮ | ⋮ | ⋮ | ⋮ | ⋮ | ⋮ | ⋮ |

TABLE VIEW 550

FIGURE 5

CAMERA ARRAY SYSTEM AND METHOD TO DETECT A LOAD STATUS OF A SEMI-TRAILER TRUCK

FIELD OF TECHNOLOGY

This disclosure relates generally to automotive technology and, more particularly, to a method, a device and/or a system of utilizing a camera array system to detect a load status of a semi-trailer truck.

BACKGROUND

A transportation service provider (e.g., a logistics provider) may be compensated based on a type of goods being carried inside a cargo area of a trailer of a transportation vehicle (e.g., a semi-trailer truck). Therefore, the transportation service provider may seek to maximize a utilization of space inside of a cargo area of the trailer. Sensors (e.g. weight sensors, wave sensors, ultrasound sensors) employed in an interior space of the cargo area may not be able detect color patterns or types of cargo.

Further, these sensors may not be able to detect exactly where in the trailer the cargo is located. Moreover, these sensors may not provide a reliable view of what is exactly happening inside of the trailer. As a result, new problems may arise such as a driver may embark on long journeys, when, in fact, their cargo area is filled with the wrong type of cargo (e.g., may even be empty). This may lead to wasted time, fuel, efficiency, customer dissatisfaction, and/or ultimately, loss of revenue for the transportation services provider.

SUMMARY

Disclosed are a method, a device and/or a system of utilizing a camera array system to detect a load status of a semi-trailer truck.

In one aspect, a trailer of a semi-trailer truck includes a sensor array affixed to a surface of the trailer to automatically determine whether a cargo area of the semi-trailer truck is occupied. The trailer of the semi-trailer truck includes a set of cameras of the sensor array. Each camera of the set of cameras is each embedded in individual recesses of the sensor array such that each of the set of cameras does not protrude from the sensor array into the cargo area and/or each of the set of cameras peers into the cargo area of the semi-trailer truck. The trailer of the semi-trailer truck further includes at least one light source to illuminate the cargo area. A memory and a processor associated with the sensor array are configured to store one baseline image of the cargo area of the trailer when the trailer is in an empty state. The processor is configured to detect a triggering event and to illuminate the cargo area of the trailer using at least one light source. The processor is further configured to capture a current image of the cargo area of the trailer using the set of cameras. The processor is configured to compare each current image of an interior cavity with the corresponding baseline image of a cargo cavity. The processor determines a cargo status based upon a difference between the current image and the baseline image. The processor is also configured to send the cargo status to a dispatcher using a cellular modem.

The sensor array may be affixed to an upper corner of the trailer. The sensor array may be affixed to a middle top-section of the trailer, such that the sensor array is placed in a separate housing from the cargo area on an exterior face of the trailer. The light source may be a light-emitting diode that is associated with each camera of the set of cameras. Each camera of the set of cameras may automatically take a photograph of the cargo area in view of each camera upon an occurrence of the triggering event. The triggering event may be a trailer opening event, a trailer closing event, a motion detection event through a global positioning device and a motion sensor in the trailer, a stopping event, a time-based event, a geographic-location based event, and/or a velocity based event.

The sensor array may include a backup camera to observe a rear area of the trailer of the semi-trailer truck. The backup camera may be mounted to the sensor array. The backup camera may view a door of the trailer, a loading area of the trailer, and/or an area behind the trailer. A driver of the trailer may view a video feed from the backup camera using a wired connection and/or a wireless connection between the backup camera and a display in a cabin area of the semi-trailer truck. The trailer of the semi-trailer truck may have a field of view of each of the set of cameras to partially overlap with the field of view of another of the set of cameras. The sensor array may be powered by a battery, the semi-trailer truck, and/or a solar array mounted on the trailer.

The sensor array may communicatively generate a composite view of the cargo area using the set of cameras. The sensor array may communicate the composite view to the cabin area of the semi-trailer truck and/or a central server communicatively coupled with the semi-trailer truck through an Internet network using the processor and the memory of the semi-trailer truck. The cellular modem may periodically provide a reporting of a location of the semi-trailer truck captured with a geographic positioning receiver to the central server along with the composite view using the processor and the memory.

In another aspect, a trailer of a semi-trailer truck includes a sensor array affixed to a surface of the trailer to automatically determine whether a cargo area of the semi-trailer truck is occupied. The trailer of the semi-trailer truck further includes a set of cameras of the sensor array. Each camera of the set of cameras is each recessed relative to an interior region of the cargo area and/or each of the set of cameras peers into the cargo area of the semi-trailer truck. A memory and a processor associated with the sensor array are configured to store one baseline image of the cargo area of the trailer when the trailer is in an empty state. The processor is configured to detect a triggering event and to illuminate the cargo area of the trailer using at least one light source. The processor is further configured to capture a current image of the cargo area of the trailer using the set of cameras. The processor compares each current image of an interior cavity with the corresponding baseline image of a cargo cavity. The processor of the sensor array is configured to determine a cargo status based upon a difference between the current image and the baseline image. Furthermore, the processor is configured to send the cargo status to a dispatcher using a cellular modem.

In yet another aspect, a trailer of a semi-trailer truck includes a sensor array affixed to a surface of the trailer to automatically determine whether a cargo area of the semi-trailer truck is occupied. The trailer of the semi-trailer truck also includes a set of cameras of the sensor array. Each camera of the set of cameras is each embedded in individual recesses of the sensor array such that each of the set of cameras are interior to a flush plane of the surface to prevent cargo from damaging each camera. Each of the set of cameras peers into the cargo area of the semi-trailer truck. The trailer of the semi-trailer truck further includes at least one light source to illuminate the cargo area. A memory and a processor associated with the sensor array are configured to store one baseline image of the cargo area of the trailer when the trailer is in an empty state. The processor is configured to detect a triggering event and/or to illuminate the cargo area of the trailer using at least one light source. The processor is further configured to capture a current image of the cargo area of the trailer using the set of cameras. The processor is also configured to compare each current image of an interior cavity with the corresponding baseline image of a cargo cavity. Furthermore, the processor is configured to determine a cargo status based upon a difference between the current image and the baseline image. Also, the processor is configured to send the cargo status to a dispatcher using a cellular modem. The sensor array includes a backup camera to observe a rear area of the trailer of the semi-trailer truck. The backup camera is mounted to the sensor array such that the backup camera views a door of the trailer, a loading area of the trailer, and/or an area behind the trailer. A driver of the trailer may view a video feed from the backup camera using a wired connection and/or a wireless connection between the backup camera and/or a display in a cabin area of the semi-trailer truck.

The method, apparatus, and system disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the Figures of the accompanying drawings, in which like references indicate similar elements and in which:

FIG. 5 is a table view illustrating the storing of undistorted baseline image captured at an empty state of the trailer of FIG. 1 and the corresponding distorted image after occurrence of the triggering event for determining the cargo status, according to one embodiment.

Figure 1A:
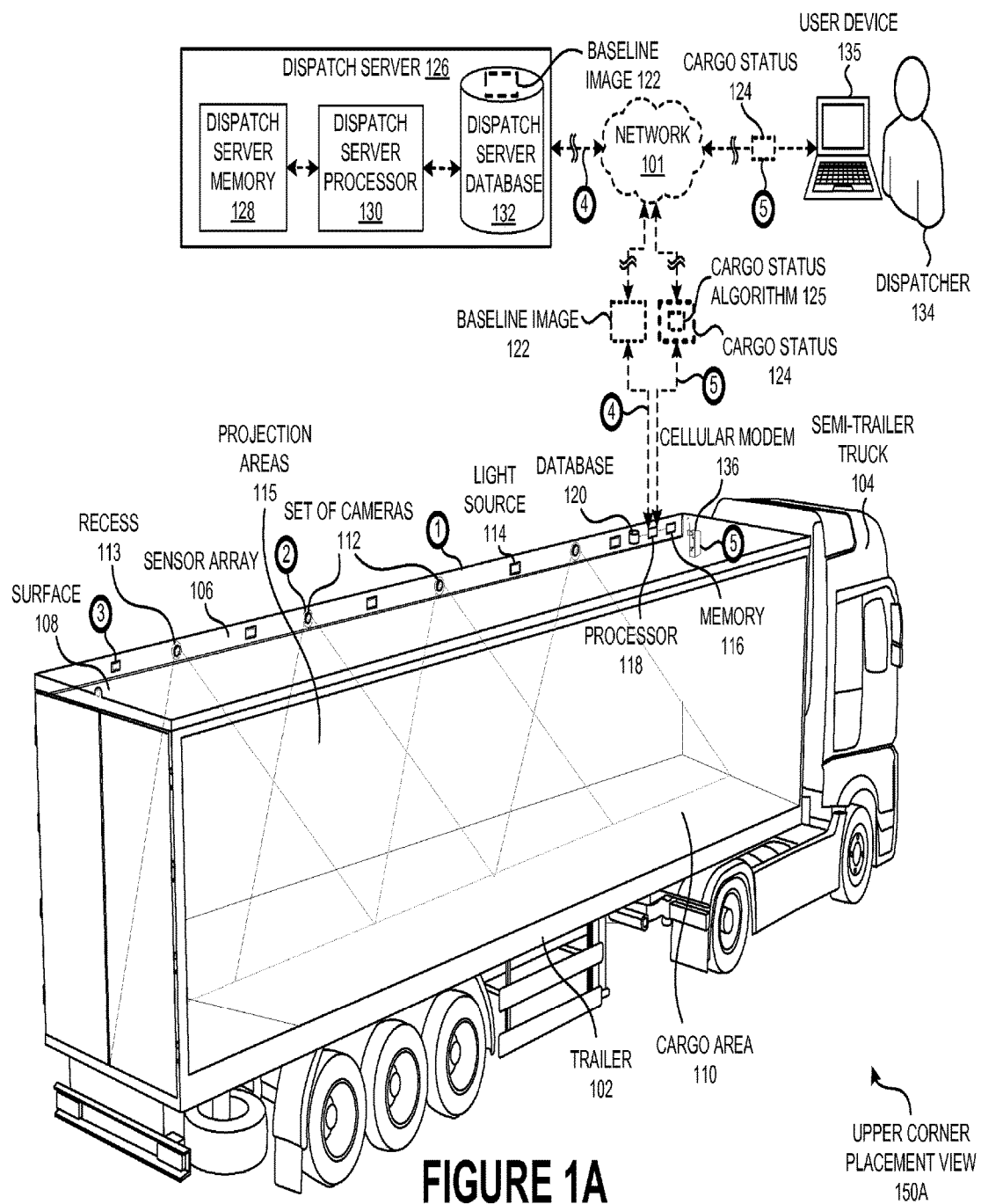
FIG. 1A is an upper corner placement view of a sensor array affixed to an upper corner of a trailer of a semi-trailer truck to automatically determine whether a cargo area of the semi-trailer truck is occupied and sending the cargo status to a dispatcher using a cellular modem, according to one embodiment.

Other features of the present embodiments will be apparent from the accompanying drawings and from the detailed description that follows.

DETAILED DESCRIPTION

Disclosed are a method, a device and/or a system of utilizing a camera array system to detect a load status of a semi-trailer truck.

In one embodiment, a trailer 102 of a semi-trailer truck 104 includes a sensor array 106 affixed to a surface 108 of the trailer 102 to automatically determine whether a cargo area 110 of the semi-trailer truck 104 is occupied. The trailer 102 of the semi-trailer truck 104 also includes a set of cameras 112 of the sensor array 106. Each camera of the set of cameras 112 is each embedded in individual recess(es) 113 of the sensor array 106 such that each of the set of cameras 112 does not protrude from the sensor array 106 into the cargo area 110 and/or each of the set of cameras 112 peers into the cargo area 110 of the semi-trailer truck 104. The trailer 102 of the semi-trailer truck 104 further includes at least one light source 114 to illuminate the cargo area 110. A memory 116 and a processor 118 associated with the sensor array 106 are configured to store one baseline image 122 of the cargo area 110 of the trailer 102 when the trailer 102 is in an empty state.

The processor 118 is configured to detect a triggering event 206 (e.g., using the triggering event algorithm 142 of the dispatch server 126) and to illuminate the cargo area 110 of the trailer 102 using at least one light source 114. The processor 118 is further configured to capture a current image 144 of the cargo area 110 of the trailer 102 using the set of cameras 112. The processor 118 is configured to compare (e.g., using the difference algorithm 148 of the dispatch server 126) each current image 144 of an interior cavity 402 with the corresponding baseline image 122 of a cargo cavity. The processor 118 determines a cargo status 124 (e.g., using the cargo status algorithm 125 of the dispatch server 126) based upon a difference (e.g., using the difference algorithm 148 of the dispatch server 126) between the current image 144 and the baseline image 122. The processor 118 is also configured to send the cargo status 124 to a dispatcher 134 using a cellular modem 136.

The sensor array 106 may be affixed to an upper corner of the trailer 102. The sensor array 106 may be affixed to a middle top-section of the trailer 102, such that the sensor array 106 is placed in a separate housing 138 from the cargo area 110 on an exterior face 140 of the trailer 102. The light source 114 may be a light-emitting diode that is associated with each camera of the set of cameras 112. Each camera of the set of cameras 112 may automatically take a photograph of the cargo area 110 in view of each camera upon an occurrence of the triggering event 206. The triggering event 206 may be a trailer opening event, a trailer closing event, a motion detection event through a global positioning device and a motion sensor in the trailer, a stopping event, a time-based event, a geographic-location based event, and/or a velocity based event.

The sensor array 106 may include a backup camera 202 to observe a rear area 204 of the trailer 102 of the semi-trailer truck 104. The backup camera 202 may be mounted to the sensor array 106. The backup camera 202 may view a door of the trailer, a loading area of the trailer, and/or an area behind the trailer. A driver 208 of the trailer 102 may view a video feed 210 from the backup camera 202 using a wired connection and/or a wireless connection between the backup camera 202 and a display 212 in a cabin area 214 of the semi-trailer truck 104. The trailer 102 of the semi-trailer truck 104 may have a field of view 404 of each of the set of cameras 112 to partially overlap with the field of view 404 of another of the set of cameras 112. The sensor array 106 may be powered by a battery, the semi-trailer truck 104, and/or a solar array mounted on the trailer 102.

The sensor array 106 may communicatively generate a composite view 146 of the cargo area 110 using the set of cameras 112. The sensor array 106 may communicate the composite view 146 to the cabin area 214 of the semi-trailer truck 104 and/or a central server communicatively coupled with the semi-trailer truck 104 through an Internet network using the processor 118 and the memory 116 of the semi-trailer truck 104. The cellular modem 136 may periodically provide a reporting of a location of the semi-trailer truck 104 captured with a geographic positioning receiver to the central server along with the composite view 146 using the processor 118 and the memory 116.

In another embodiment, a trailer 102 of a semi-trailer truck 104 includes a sensor array 106 affixed to a surface 108 of the trailer 102 to automatically determine whether a cargo area 110 of the semi-trailer truck 104 is occupied. The trailer 102 of the semi-trailer truck 104 further includes a set of cameras 112 of the sensor array 106. Each camera of the set of cameras 112 is each recessed relative to an interior region of the cargo area 110 and/or each of the set of cameras 112 peers into the cargo area 110 of the semi-trailer truck 104. A memory 116 and a processor 118 associated with the sensor array 106 are configured to store one baseline image 122 of the cargo area 110 of the trailer 102 when the trailer 102 is in an empty state. The processor 118 is configured to detect a triggering event 206 (e.g., using the triggering event algorithm 142 of the dispatch server 126) and to illuminate the cargo area 110 of the trailer 102 using at least one light source 114. The processor 118 is further configured to capture a current image 144 of the cargo area 110 of the trailer 102 using the set of cameras 112. The processor 118 compares (e.g., using the difference algorithm 148 of the dispatch server 126) each current image 144 of an interior cavity 402 with the corresponding baseline image 122 of a cargo cavity. The processor 118 associated with the sensor array 106 is configured to determine a cargo status 124 (e.g., using the cargo status algorithm 125 of the dispatch server 126) based upon a difference 148 (e.g., using the difference algorithm 148 of the dispatch server 126) between the current image 144 and the baseline image 122. Furthermore, the processor 118 is configured to send the cargo status 124 to a dispatcher 134 using a cellular modem 136.

In yet another embodiment, a trailer 102 of a semi-trailer truck 104 includes a sensor array 106 affixed to a surface 108 of the trailer 102 to automatically determine whether a cargo area 110 of the semi-trailer truck 104 is occupied. The trailer 102 of the semi-trailer truck 104 also includes a set of cameras 112 of the sensor array 106. Each camera of the set of cameras 112 is each embedded in individual recess(es) 113 of the sensor array 106 such that each of the set of cameras 112 are interior to a flush plane of the surface 108 to prevent cargo from damaging each camera. Each of the set of cameras 112 peers into the cargo area 110 of the semi-trailer truck 104. The trailer 102 of the semi-trailer truck 104 further includes at least one light source 114 to illuminate the cargo area 110.

A memory 116 and a processor 118 associated with the sensor array 106 are configured to store one baseline image 122 of the cargo area 110 of the trailer 102 when the trailer 102 is in an empty state. The processor 118 is configured to detect a triggering event 206 and/or to illuminate the cargo area 110 of the trailer 102 using at least one light source 114. The processor 118 is further configured to capture a current image 144 of the cargo area 110 of the trailer 102 using the set of cameras 112. The processor 118 is also configured to compare each current image 144 of an interior cavity 402 with the corresponding baseline image 122 of a cargo cavity. Furthermore, the processor 118 is configured to determine a cargo status 124 (e.g., using the cargo status algorithm 125 of the dispatch server 126) based upon a difference 148 (e.g., using the difference algorithm 148 of the dispatch server 126) between the current image 144 and the baseline image 122. Also, the processor 118 is configured to send the cargo status 124 to a dispatcher 134 using a cellular modem 136.

The sensor array 106 includes a backup camera 202 to observe a rear area 204 of the trailer 102 of the semi-trailer truck 104. The backup camera 202 is mounted to the sensor array 106 such that the backup camera 202 views (e.g., using the triggering event algorithm 142 of the dispatch server 126) a door of the trailer, a loading area of the trailer, and/or an area behind the trailer. A driver 208 of the trailer 102 may view a video feed 210 from the backup camera 202 using a wired connection and/or a wireless connection between the backup camera 202 and/or a display 212 in a cabin area 214 of the semi-trailer truck 104.

FIG. 1A is a upper corner placement view 150A of a sensor array illustrating the sensor array 106 affixed to an upper corner of a trailer 102 of a semi-trailer truck 104 to automatically determine whether a cargo area 110 of the semi-trailer truck 104 is occupied and sending the cargo status 124 to a dispatcher 134 using a cellular modem 136, according to one embodiment.

Particularly, FIG. 1A illustrates the trailer 102, a network 101, the semi-trailer truck 104, the sensor array 106, the surface 108, the cargo area 110, a set of cameras 112, a recess 113, a light source 114, a projection areas 115, a memory 116, a processor 118, a database 120, a baseline image 122, a cargo status 124, a cargo status algorithm 125, a dispatch server 126, a dispatch server memory 128, a dispatch server processor 130, a dispatch server database 132, a dispatcher 134, a user device 135, and a cellular modem 136, according to one embodiment.

The trailer 102 may be a nonmotorized vehicle designed to be hauled by a motor vehicle (e.g., a truck, utility vehicles, and/or a tractor). The network 101 may be a group of computing devices (e.g., hardware and software) that are linked together through communication channels to facilitate communication and resource-sharing among a wide range of entities (e.g., dispatcher 134). The semi-trailer truck 104 may be a large vehicle that consists of a towing engine, known as a tractor and/or a truck, attached to one or more semi-trailers to carry freight, according to one embodiment.

The sensor array 106 may be a device in the form of a bar and/or a series of bars that may be affixed to a wall and/or upright supports (e.g., a surface 108 of the trailer 102) which detects or measures a physical property (e.g., light, heat, motion, moisture, pressure, or any one of a great number of other environmental phenomena) of the occupancy inside the trailer 102 and records, indicates, and/or otherwise responds to it as an output. The sensor array 106 (e.g., a sensor rail, a sensor housing, etc.) may hold a single camera or may hold multiple cameras. The sensor array 106 may be connected through a wired and/or wired networking topology. In one embodiment, cameras are positioned in different locations of the trailer 102 individually, and the sensor array 106 provides a housing in which to communicatively couple the sensor array 106 to the trailer without the need of a separate rail. In another embodiment, the sensor array 106 includes multiple cameras on a single sensor rail. The sensor array 106 may include optional temperature, humidity, and/or pressure sensing in addition to visual sensing to determine general conditions in which cargo is housed inside the trailer 102.

The output may be generally a signal that is converted to human-readable display at the sensor location or transmitted electronically over the network 101 for reading or further processing to determine the cargo status 124 of the trailer 102. The surface 108 may be the uppermost layer of the wall or ceiling of the trailer 102 on which the sensor array 106 is affixed. The cargo area 110 may be the space inside the trailer 102 of the semi-trailer truck 104 where the goods are kept for freighting, according to one embodiment.

The set of cameras 112 may be a group and/or a collection of a number of cameras that may be used for recording visual images of the inside of the trailer 102 in the form of photographs, film, or video signals. The recess 113 may be a small space created by building part of a wall of the trailer 102 further back from the rest so as to affix the set of cameras 112 of the sensor array 106. The light source 114 may be any device serving as a source of illumination to make things visible inside the trailer 102. The projection areas 115 may be the extent or measurement covered by each camera of the set of cameras 112 to capture visual images of the inside of the trailer 102 in the form of photographs, film, or video signals, according to one embodiment.

The memory 116 may be an electronic holding place for instructions and data that the processor 118 of the sensor array 106 can reach quickly. The processor 118 may be a logic circuitry that responds to and processes the basic instructions that drives the sensor array 106 for monitoring the semi-trailer truck 104. The database 120 may be a structured collection of information collected by the set of cameras 112 that is organized to be easily accessed, managed, and/or updated by the dispatcher 134. The baseline image 122 may be a visual representation of the inside of the cargo area 110 of the trailer 102 at an empty state. The cargo status 124 may be the present situation of the cargo area 110 in terms of occupancy of goods in the trailer 102 as captured by the set of cameras 112. The cargo status algorithm 125 may be a process or set of rules to be followed in calculations or other problem-solving operations for identifying the occupancy of goods in the cargo area 110 of the trailer 102.

The dispatch server 126 may be a computer system that provides local area networking services to multiple users (e.g., dispatcher 134) to send off the cargo to its respective destination by managing resources and services of the network 101, while handling requests by the dispatcher 134 from different computers to access the said resources, according to one embodiment.

The dispatch server memory 128 may be an electronic holding place for instructions and data that the dispatch server processor 130 can reach quickly. The dispatch server processor 130 may be a logic circuitry that responds to and processes the basic instructions that drives the dispatch server 126 for monitoring the semi-trailer truck 104. The dispatch server database 132 may be a collection of information that is organized to be easily accessed, managed, and/or updated by the dispatcher 134, according to one embodiment. The dispatcher 134 may be the personnel responsible (e.g., overseeing) for receiving and transmitting pure and reliable messages, tracking vehicles and equipment, and recording other important information regarding the cargo status 124 (e.g., using the cargo status algorithm 125 of the dispatch server 126) of the semi-trailer truck 104. The user device 135 may be a computing device that enables the dispatcher 134 to communicate with the dispatch server 126 through the network 101. The cellular modem 136 may be a device that adds wireless 3G or 4G (LTE) connectivity to a laptop or a desktop computer in order to send the cargo status 124 to the dispatcher 134, according to one embodiment.

FIG. 1A illustrates a sensor array 106 affixed to an upper corner of the trailer 102. The sensor array 106 includes a set of cameras 112. Each camera is each embedded in an individual recess 113 of the sensor array 106. At least one light source 114 is coupled with each of the set of cameras 112. The sensor array 106 is communicatively coupled to a dispatch server 126 through the network 101. The dispatch server 126 includes a dispatch server database 132 coupled with a dispatch server processor 130 and dispatch server memory 128, according to one embodiment. The dispatch server 126 is communicatively coupled to the user device 135 through the network 101. The sensor array 106 is communicatively coupled to the dispatch server 126 through a cellular modem 136, according to one embodiment.

The cargo status 124 may be automatically determined using the sensor array 106. In circle '1', the sensor array 106 is affixed to the upper corner of the trailer 102. In circle '2', each camera is each embedded in an individual recess 113 of the sensor array 106. In circle '3', at least one light source 114 illuminates the cargo area 110 associated with each camera of the set of cameras 112. In circle '4', a baseline image 122 captured by the set of cameras 112 is communicated to the dispatch server 126. In circle '5', cargo status 124 is communicated to the dispatcher 134 through the cellular modem 136, according to one embodiment.

Figure 1B:
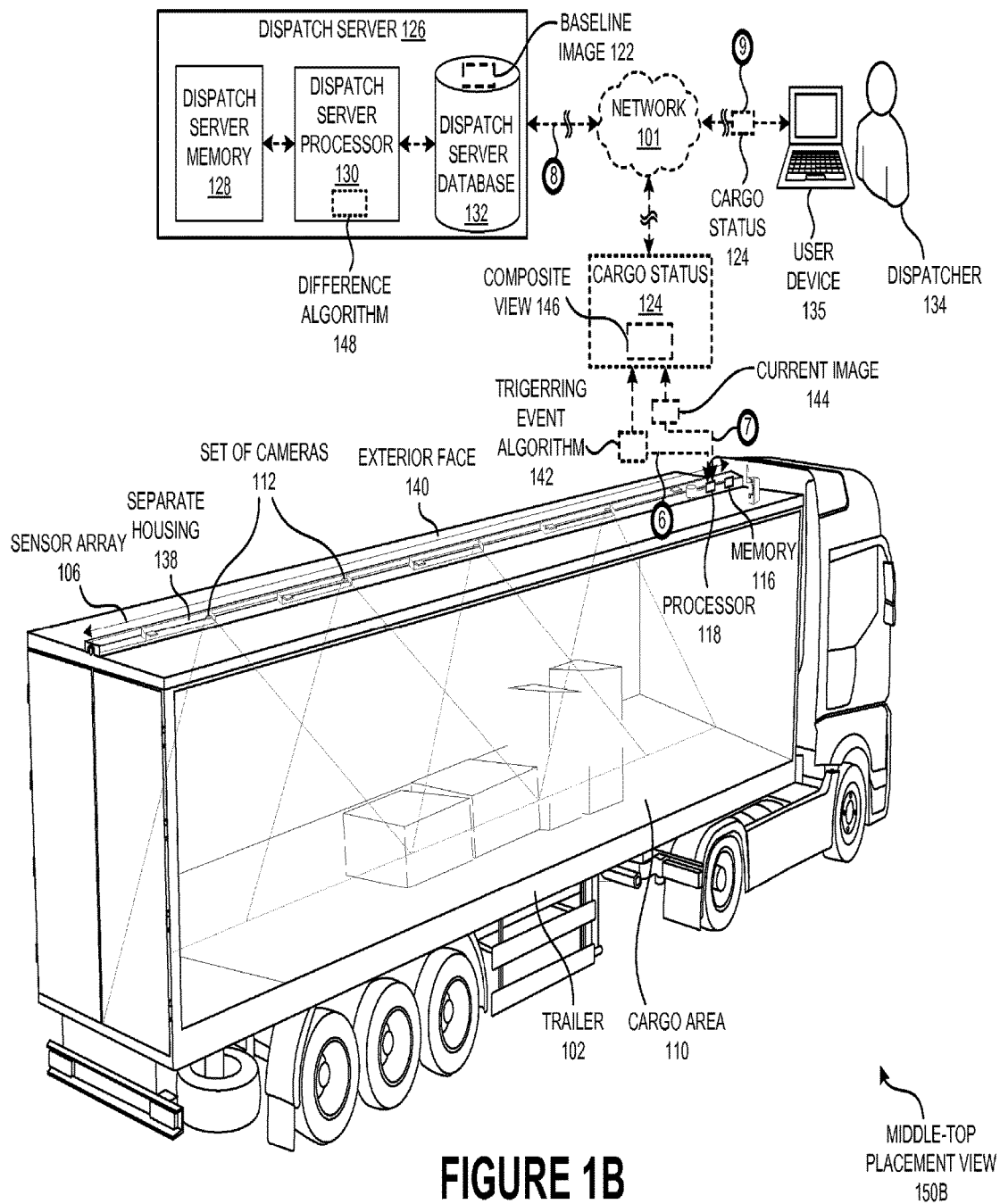
FIG. 1B is a middle top placement view of the sensor array of FIG. 1 illustrating a set of camera communicatively generating a composite view of the cargo area based on a triggering event, according to at least one embodiment.

FIG. 1B is a middle-top placement view 150B of the sensor array 106 of FIG. 1 illustrating a set of cameras 112 communicatively generating a composite view 146 of the cargo area 110 based on a triggering event (e.g., using the triggering event algorithm 142 of the dispatch server 126), according to one embodiment. Particularly, FIG. 1B illustrates a separate housing 138, an exterior face 140, a triggering event algorithm 142, a current image 144, a composite view 146, and a difference algorithm 148, according to one embodiment.

According to at least one embodiment, the separate housing 138 may be a discrete rigid casing that encloses and protects the various components of the sensor array 106. The exterior face 140 may be outermost part of the middle-top section of the trailer 102 on which the sensor array 106 is affixed. The triggering event algorithm 142 may be a process or set of rules to be followed in calculations or other problem-solving operations for identifying the occurrence of a trailer opening event, a trailer closing event, a motion detection event (e.g., using a global positioning device and/or a motion sensor), a stopping event, a time-based event, a geographic-location based event, and/or a velocity based event of the trailer 102 of semi-trailer truck 104, according to one embodiment.

The current image 144 may be the present visual representation of the inside of the cargo area 110 of the trailer 102 after occurrence of the triggering event. The composite view 146 may be a combined visual representation of the inside of the cargo area 110 of the trailer 102 captured by the set of cameras 112 after occurrence of the triggering event. The difference algorithm 148 may be a process or set of rules to be followed in calculations or other problem-solving operations for identifying the distinctness or dissimilarity of the composite view 146 of the cargo area 110 after occurrence of the triggering event from the baseline image 122 of the cargo area 110 at an empty state, according to one embodiment.

FIG. 1B illustrates a sensor array 106 affixed to a middle-top section of the trailer 102 on the exterior face 140. The sensor array 106 is placed in a separate housing 138 from the cargo area, according to one embodiment.

The cargo status 124 based on a triggering event may be automatically determined using the sensor array 106. In circle '6', a triggering event (e.g., using the triggering event algorithm 142 of the dispatch server 126) is identified by the processor 118 of the sensor array 106. In circle '7', a current image 144 captured by the set of cameras 112 is communicated to the dispatch server 126. In circle '8', the composite view is communicated to the dispatch server 126. In circle '9', the cargo status 124 (e.g., using the cargo status algorithm 125 of the dispatch server 126) is communicated to the dispatch server 126, according to one embodiment.

Figure 2:
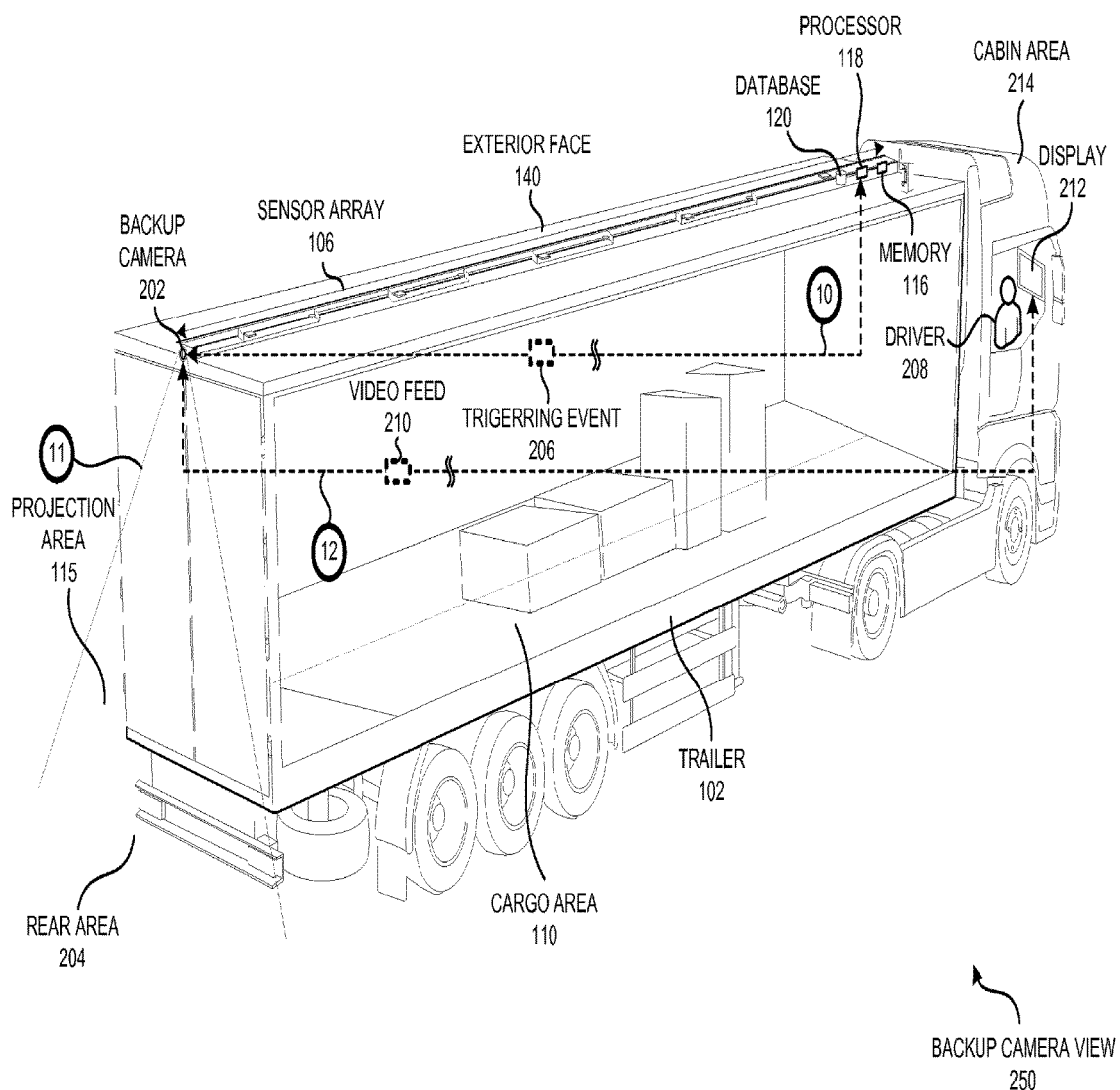
FIG. 2 is a backup camera view of the sensor array of FIG. 1 illustrating a backup camera mounted to the sensor array enabling a driver of the trailer to view a video feed from the backup camera, according to at least one embodiment.

FIG. 2 is a backup camera view 250 illustrating a backup camera 202 mounted to the sensor array of FIG. 1 enabling a driver 208 of the trailer 102 to view a video feed 210 from the backup camera 202, according to one embodiment. Particularly, FIG. 2 illustrates a backup camera 202, a rear area 204, a triggering event 206, a driver 208, a video feed 210, a display 212, and a cabin area 214, according to one embodiment.

The backup camera 202 may be a used for recording visual images of the rear area 204 of the trailer 102 in the form of photographs, film, or video signals. The rear area 204 may be the back part of the trailer 102 (e.g., a door of the trailer, a loading area of the trailer, and/or an area behind the trailer). The triggering event 206 may be a situation (e.g., a trailer opening event, a trailer closing event, a motion detection event, a stopping event, a time-based event, a geographic-location based event, and/or a velocity based event) to cause the set of cameras 112 of the sensor array 106 to record the visual images of the inside of the cargo area 110. The driver 208 may be the person driving the semi-trailer truck 104. The video feed 210 may be a sequence of images from the set of cameras processed electronically into an analog or digital format and displayed on a display 212 with sufficient rapidity so as to create the illusion of motion and continuity. The display 212 may be a computer output surface and projecting mechanism that shows video feed 210 or graphic images to the driver 208, using a cathode ray tube (CRT), liquid crystal display (LCD), light-emitting diode, gas plasma, or other image projection technology. The cabin area 214 may be the private compartment for the driver 208 in the front portion of the semi-trailer truck 104, according to one embodiment.

FIG. 2 illustrates a backup camera 202 mounted to the sensor array 106 to observe the rear area 204 of the trailer 102 of the semi-trailer truck 104, according to one embodiment.

In circle '10', the triggering event is communicated to the processor 118. In circle '11', the projection area 115 in the rear area 204 of the trailer 102 is captured by the backup camera 202. In circle '12', the video feed 210 is sent to the driver 208 using a wired connection and/or a wireless connection of the sensor array 106, according to one embodiment.

Figure 3:
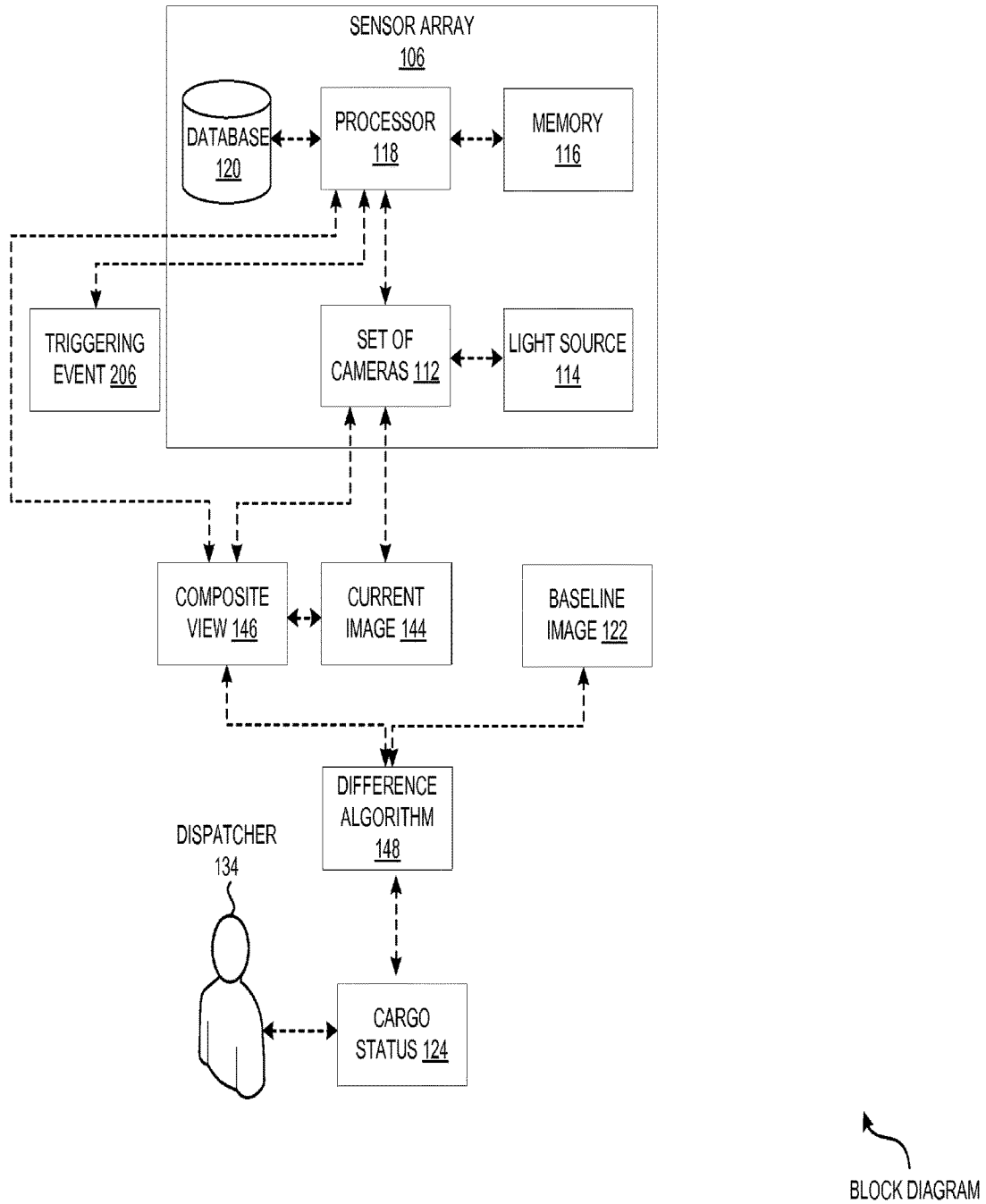
FIG. 3 is a block diagram representing one embodiment of the sensor array of the trailer of semi-trailer truck illustrated in FIG. 1.

FIG. 3 is a block diagram 350 representing one embodiment of the sensor array 106 of the trailer of semi-trailer truck 104 illustrated in FIG. 1. According to one example embodiment, the sensor array 106 includes a set of cameras 112 associated with a light source 114. The sensor array 106 of the trailer of semi-trailer truck 104 further includes a processor 118, a database 120 and a memory 116.

The processor 118 of the sensor array 106 may be configured to capture the baseline image 122 using the set of cameras 112. The light source 114 associated with each of the set of cameras 112 illuminates the inside cavity of the cargo area 110. The processor 118 identifies the triggering event (e.g., using the triggering event algorithm 142 of the dispatch server 126) caused by a trailer opening event, a trailer closing event, a motion detection event, a stopping event, a time-based event, a geographic-location based event, and/or a velocity based event. A current image 144 is captured by each of the set of cameras 112. A composite view 146 is generated based on the current image 144 captured by each of the set of cameras 112. The composite view 146 and the baseline image 122 is compared to conclude the cargo status 124 (e.g., using the cargo status algorithm 125 of the dispatch server 126) of the trailer 102. The cargo status 124 is communicated to the dispatcher 134, according to one embodiment.

Figure 4:
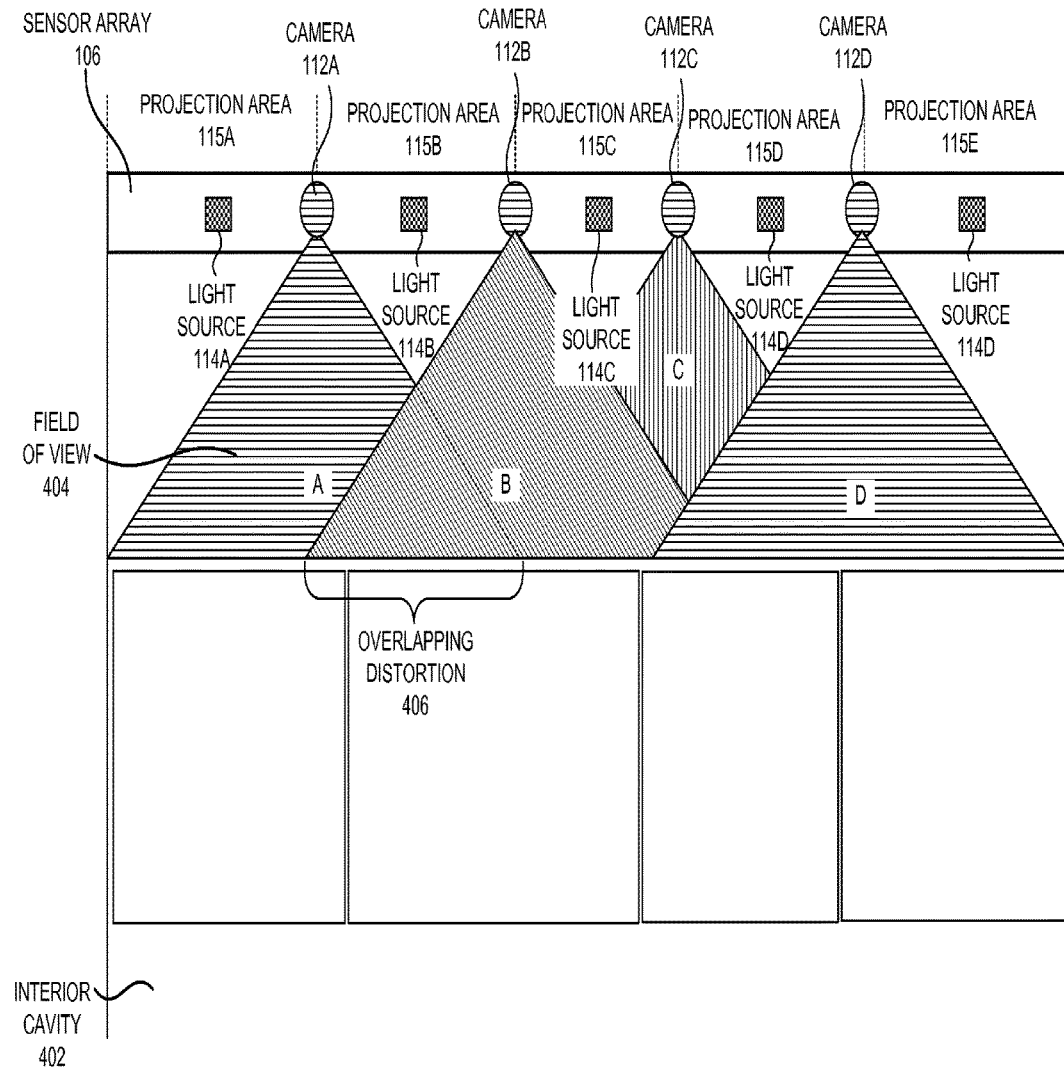
FIG. 4 is a composite view illustrating the overlapping distortion captured by each camera of the set of cameras of the sensor array of FIG. 1 providing the cargo status of the trailer, according to one embodiment.

FIG. 4 is a composite view 450 illustrating the overlapping distortion 406 captured by each camera 112A-D of the set of cameras 112 of the sensor array 106 of FIG. 1 providing the cargo status 124 of the trailer 102, according to one embodiment.

Particularly, FIG. 4 illustrates an interior cavity 402, a field of view 404, and an overlapping distortion 406. The interior cavity 402 may be an empty space inside the trailer 102 of the semi-trailer truck where the cargo is kept for dispatch. The field of view 404 may be the extent or measurement covered by each camera of the set of cameras 112 to capture visual images of the inside of the trailer 102 in the form of photographs, film, or video signals. The overlapping distortion 406 may be the covering or extension of field of view 404 of one camera over the field of view 404 of its adjoining camera of the set of cameras 112 of the sensor array 106, according to one embodiment.

Particularly, composite view 450 illustrates an example embodiment of the sensor array 106 running the length of the trailer 102 with embedded set of cameras 112, electronics, wiring and LED light source and other sensors mounted on ceiling. Each camera is looking for distortion from reference baseline image 122. No distortion from any of the camera indicates that the trailer is empty. Overlapping distortion 406 provides information on the extent of quadrant load in each of the projection areas 114A-E. Each quadrant (e.g., projection areas 114A-E) represents 20% of the cargo area 110. If only projection area 114A has distortion, then the trailer <1=20% full. If projection areas 114A and B has distortion, then the trailer <1=40% full. If only projection areas 114A, B and C has distortion, then the trailer <1=60% full and if projection area 114A, B, and C has distortion, then the trailer is <1=80% full, according to one embodiment.

FIG. 5 is a table view illustrating the storing of undistorted baseline image 122 captured at empty state of the trailer 102 of FIG. 1 and the corresponding distorted image after occurrence of the triggering event 206 for determining the cargo status 124, according to one embodiment. Particularly, FIG. 5 is a table view 550 showing the fields associated with the dispatcher 134, a trailer 102 field, a set of cameras 112 field, a baseline image distortion 502 field, a triggering event 206 field, distortion in current image 504 field, and a cargo status 124 field, according to one embodiment.

Particularly, FIG. 5 illustrates an example of two records for a dispatcher 134 with two trailers having a sensor array having a set of cameras 112 affixed to each of its trailer 102. The baseline image(s) 122 captured in empty state of the trailer 1 and 2 shows no distortion as shown in the 502 field. The triggering event 206 caused by the trailer opening event in trailer 1 depicts a distortion in current image 504 captured by camera 112A of trailer 1. The resulting cargo status 124 is shown as <1=20% full caused by the triggering event 206 as communicated to the dispatcher 134. Similarly, the triggering event 206 caused by the velocity based event in trailer 2 depicts a distortion in current image 504 captured by camera 112A-C of trailer 2. The resulting cargo status 124 is shown as <1=60% full caused by the triggering event 206 is communicated to the dispatcher 134, according to one embodiment.

Figure 6:
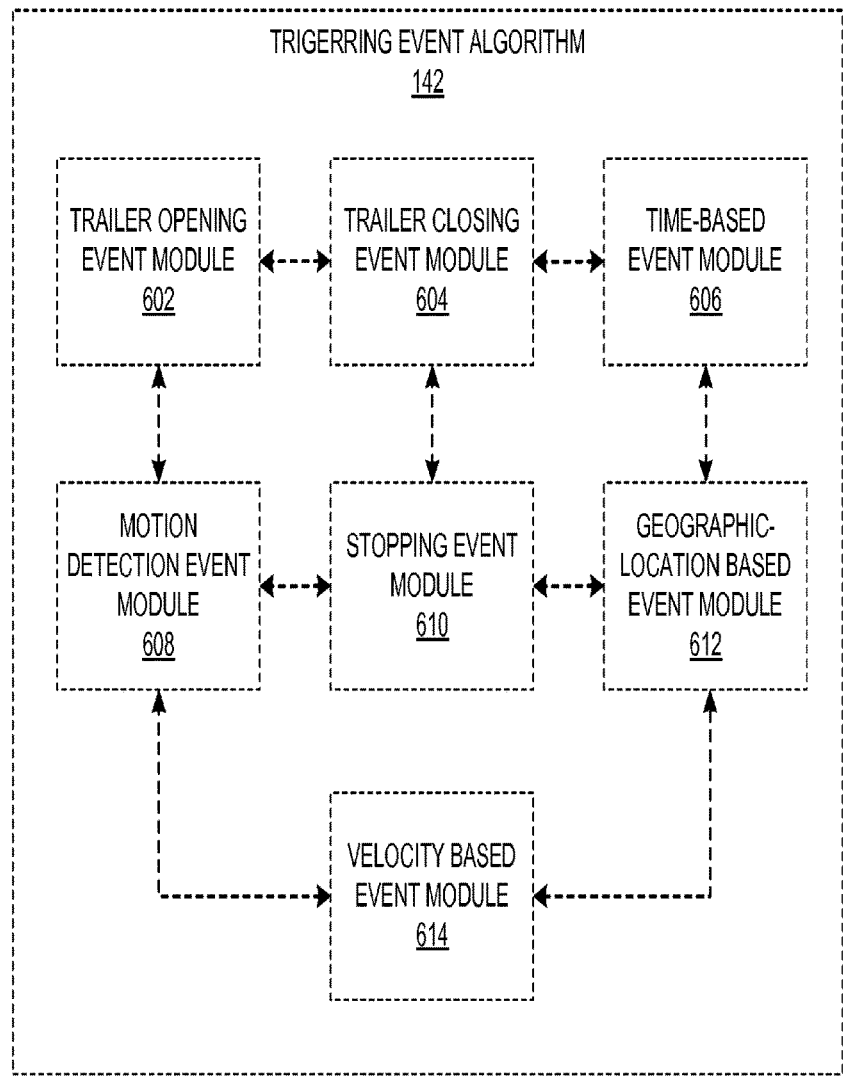
FIG. 6 is an exploded view of the triggering event algorithm of the sensor array of FIG. 1, according to one embodiment.

FIG. 6 is an exploded view of the triggering event algorithm 142 of the sensor array 106 of FIG. 1, according to one embodiment. Particularly, FIG. 6 illustrates a trailer opening event module 602, a trailer closing event module 604, a time-based event module 606, a motion detection event module 608, a stopping event module 610, a geographic-location based event module 612, and a velocity based event module 614, according to one embodiment.

The trailer opening event module 602 may be a part and/or a separate unit of a program of the triggering event algorithm 142 that assists in identifying the occurrence of a trailer opening event in order to activate the set of cameras 112 to capture the current image 144. The trailer closing event module 604 may be a part and/or a separate unit of a program of the triggering event algorithm 142 that assists in identifying the occurrence of a trailer closing event in order to activate the set of cameras 112 to capture the current image 144. The time-based event module 606 may be a part and/or a separate unit of a program of the triggering event algorithm 142 that assists in identifying the occurrence of an event based on time, according to one embodiment.

The motion detection event module 608 may be a part and/or a separate unit of a program of the triggering event algorithm 142 to detect motion of the semi-trailer truck 104. The stopping event module 610 may be a part and/or a separate unit of a program of the triggering event algorithm 142 that assists in identifying the stopping of the semi-trailer truck 104. The geographic-location based event module 612 may be a part and/or a separate unit of a program of the triggering event algorithm 142 that assists in identifying the occurrence of a situation based on the geographic-location of the semi-trailer truck 104. The velocity based event module 614 may be a part and/or a separate unit of a program of the triggering event algorithm 142 that assists in identifying the occurrence of a situation based on the velocity of the semi-trailer truck 104, according to one embodiment.

Figure 7:
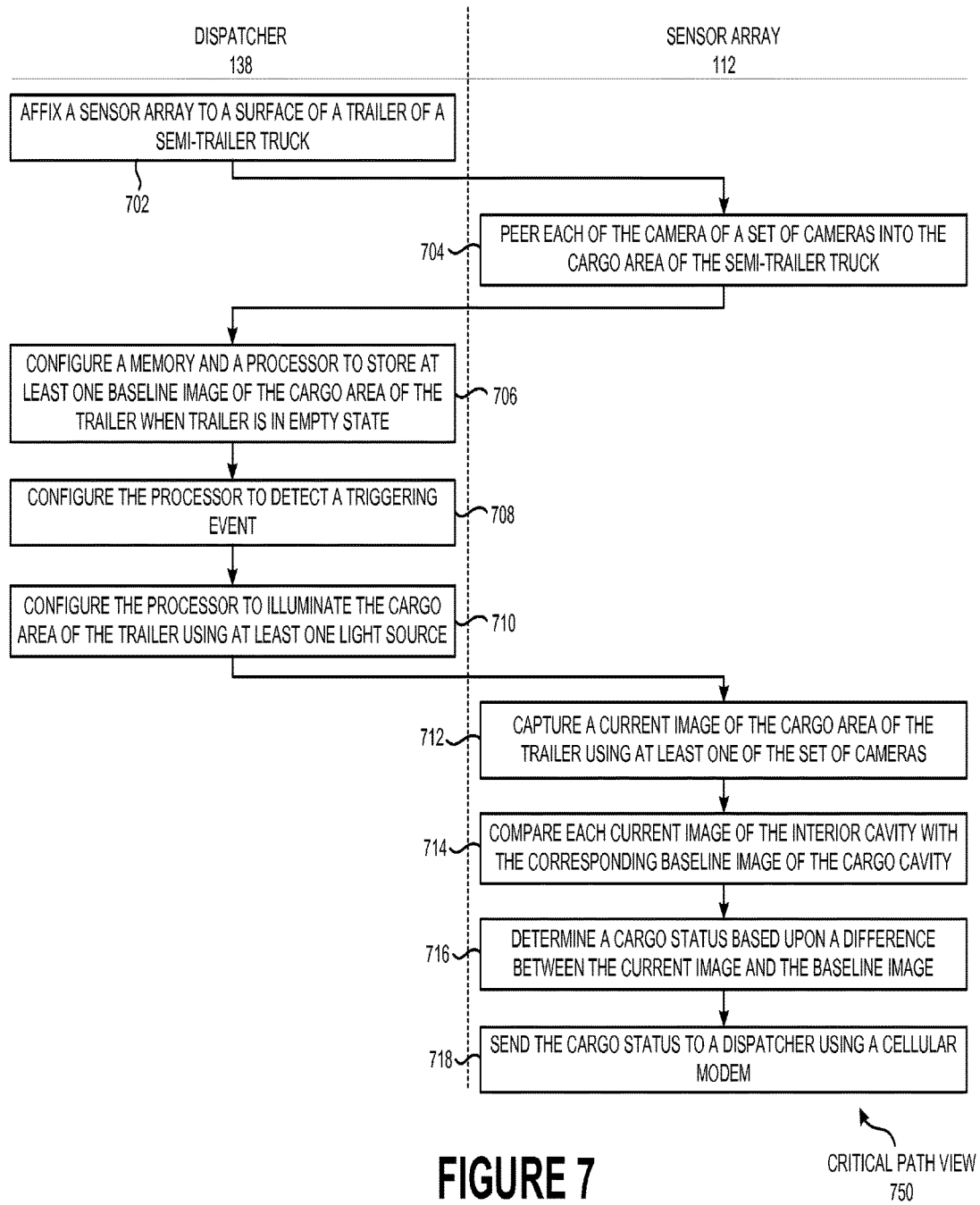
FIG. 7 is a critical path view illustrating a flow based on time in which critical operations of the sensor array of FIG. 1 are established, according to one embodiment.

FIG. 7 is a critical path view illustrating a flow based on time in which critical operations of the sensor array of FIG. 1 are established, according to one embodiment.

In operation 702, the dispatcher 134 affixes a sensor array 106 to a surface 108 of a trailer 102 of a semi-trailer truck 104. In operation 704, the sensor array 106 peers each of the camera of the set of cameras 112 into the cargo area 110 of the semi-trailer truck 104. In operation 706, the dispatcher 134 configures a memory 116 and a processor 118 to store at least one baseline image 122 of the cargo area 110 of the trailer 102 when trailer is in empty state. In operation 708, the dispatcher 134 configures the processor 118 to detect a triggering event 206. In operation 710, the dispatcher 134 configures the processor 118 to illuminate the cargo area 110 of the trailer 102 using at least one light source 114. In operation 712, the sensor array 106 captures a current image 144 of the cargo area 110 of the trailer 102 using at least one of the set of cameras 112. In operation 714, the sensor array 106 compares each current image 144 of the interior cavity with the corresponding baseline image 122 of the cargo cavity. In operation 716, the sensor array 106 determines a cargo status 124 based upon a difference between the current image 144 and the baseline image 122. In operation 718, the sensor array 106 sends the cargo status 124 to a dispatcher 134 using a cellular modem 136, according to one embodiment.

Figure 8:
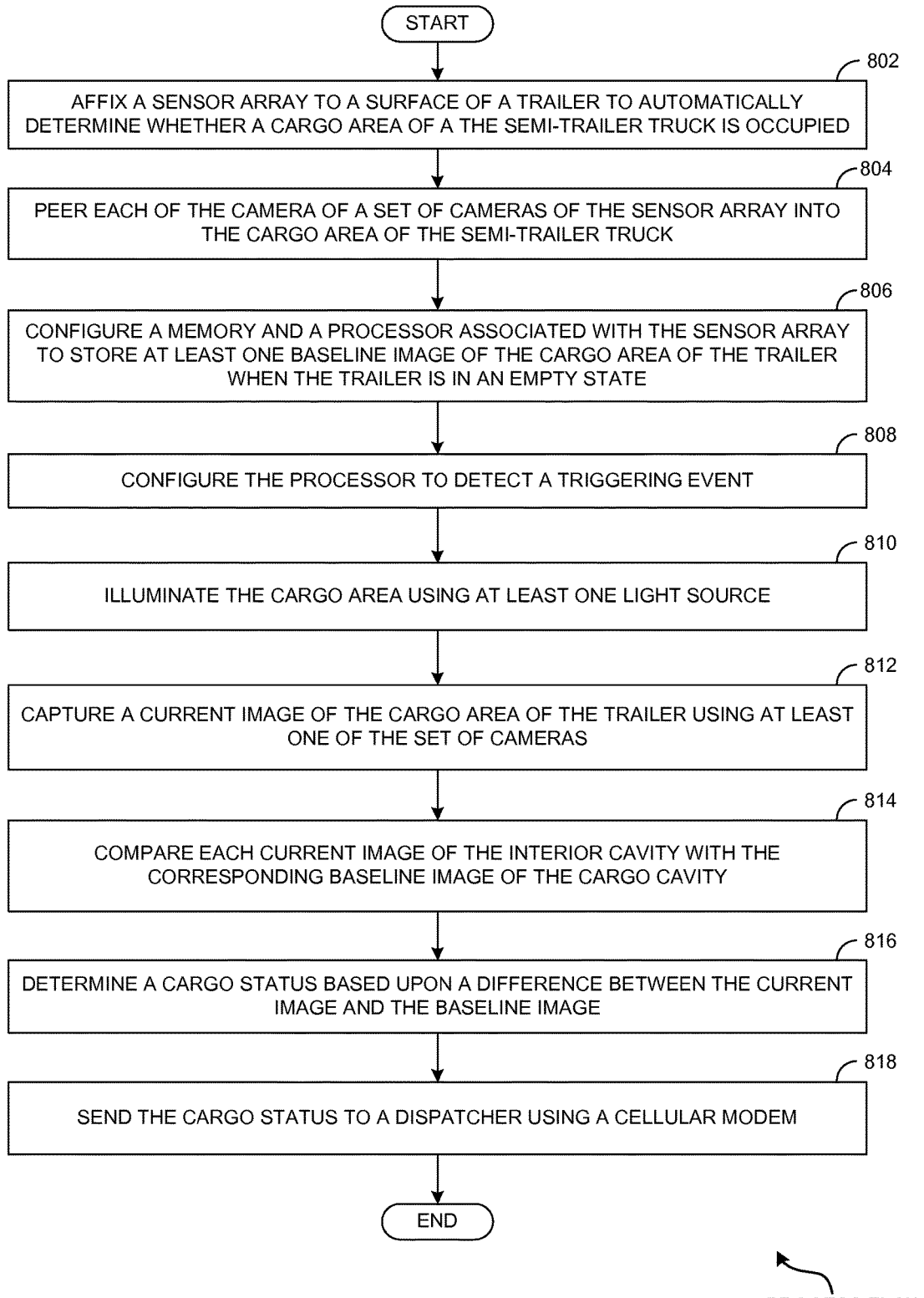
FIG. 8 is a process flow diagram of the sensor array of FIG. 1 to determine the cargo status of the trailer of the semi-trailer truck of FIG. 1, according to one embodiment.

FIG. 8 is a process flow diagram of the sensor array 106 of FIG. 1 to determine the cargo status 124 of the trailer 102 of the semi-trailer truck 104 of FIG. 1, according to one embodiment.

In operation 802, a sensor array 106 is affixed to a surface 108 of a trailer 102 to automatically determine whether a cargo area 110 of the semi-trailer truck 104 is occupied. In operation 804, each of the camera 112A-D of a set of cameras 112 of the sensor array 106 peers into the cargo area 110 of the semi-trailer truck 104. In operation 806, a memory 116 and a processor 118 associated with the sensor array 106 are configured to store at least one baseline image 122 of the cargo area 110 of the trailer 102 when the trailer 102 is in an empty state. In operation 808, the processor 118 is configured to detect a triggering event 206. In operation 810, the cargo area 110 is illuminated using at least one light source 114. In operation 812, a current image 144 of the cargo area 110 of the trailer 102 is captured using at least one of the set of cameras 112, according to one embodiment.

In operation 814, each current image 144 of the interior cavity is compared with the corresponding baseline image 122 of the cargo cavity. In operation 816, a cargo status 124 is determined based upon a difference between the current image 144 and the baseline image 122. In operation 818, the cargo status 124 is sent to a dispatcher 134 using a cellular modem 136, according to one embodiment.

Figure 9:
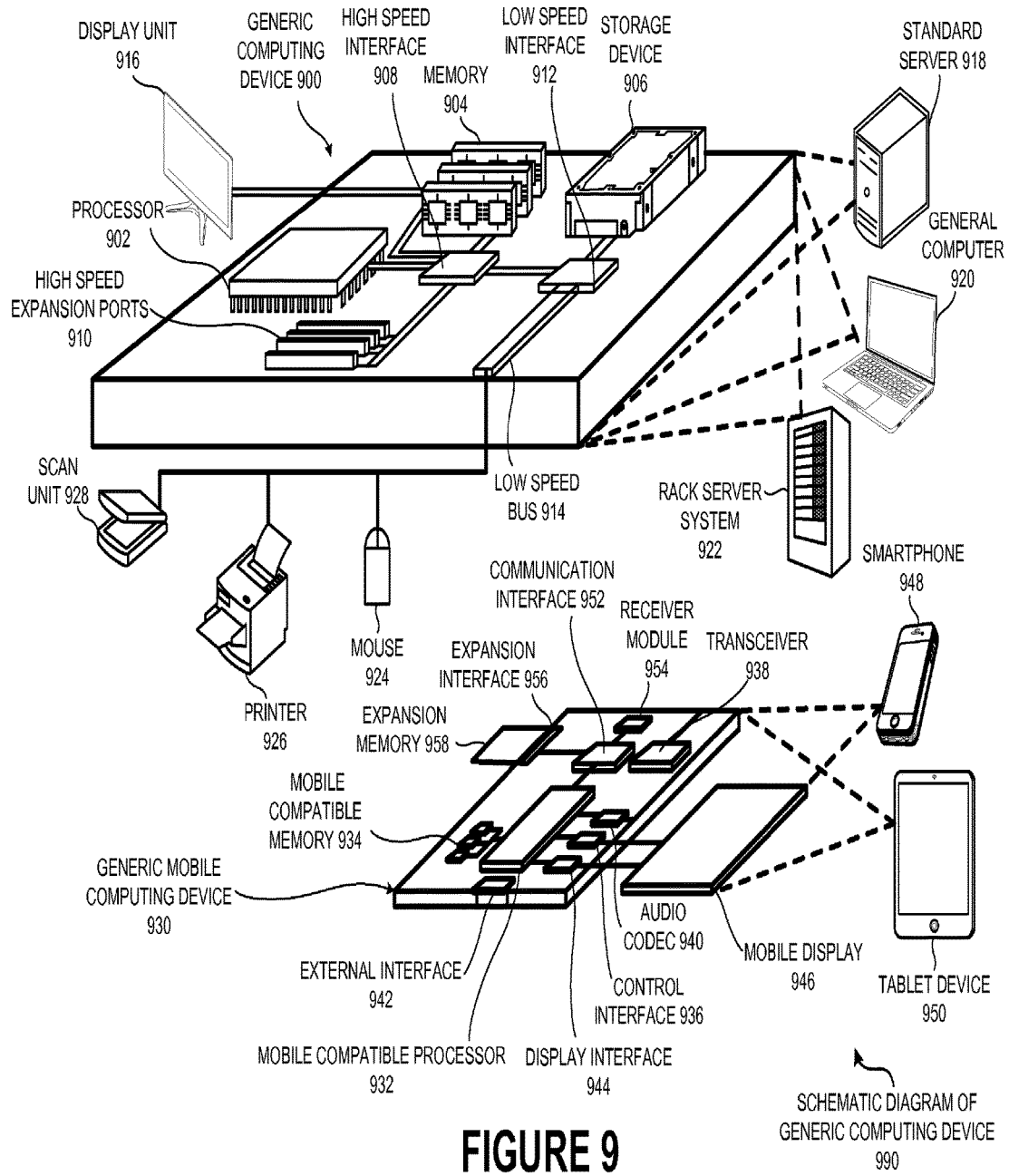
FIG. 9 is a schematic diagram of exemplary data processing devices that can be used to implement the methods and systems disclosed herein, according to one embodiment.

FIG. 9 is a schematic diagram of generic computing device 990 that can be used to implement the methods and systems disclosed herein, according to one or more embodiments. FIG. 9 is a schematic diagram of generic computing device 990 and a generic mobile computing device 930 that can be used to perform and/or implement any of the embodiments disclosed herein. In one or more embodiments, dispatch server 126 and/or user device 135 of FIG. 1A may be the generic computing device 900.

The generic computing device 900 may represent various forms of digital computers, such as laptops, desktops, workstations, personal digital assistants, servers, blade servers, mainframes, and/or other appropriate computers. The generic mobile computing device 930 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The generic computing device 900 may include a processor 902, a memory 904, a storage device 906, a high speed interface 908 coupled to the memory 904 and a plurality of high speed expansion ports 910, and a low speed interface 912 coupled to a low speed bus 914 and a storage device 906. In one embodiment, each of the components heretofore may be inter-coupled using various buses, and may be mounted on a common motherboard and/or in other manners as appropriate. The processor 902 may process instructions for execution in the generic computing device 900, including instructions stored in the memory 904 and/or on the storage device 906 to display a graphical information for a GUI on an external input/output device, such as a display unit 916 coupled to the high speed interface 908, according to one embodiment.

In other embodiments, multiple processors and/or multiple buses may be used, as appropriate, along with multiple memories and/or types of memory. Also, a plurality of computing device 900 may be coupled with, with each device providing portions of the necessary operations (e.g., as a server bank, a group of blade servers, and/or a multi-processor system).

The memory 904 may be coupled to the generic computing device 900. In one embodiment, the memory 904 may be a volatile memory. In another embodiment, the memory 904 may be a non-volatile memory. The memory 904 may also be another form of computer-readable medium, such as a magnetic and/or an optical disk. The storage device 906 may be capable of providing mass storage for the generic computing device 900. In one embodiment, the storage device 906 may be includes a floppy disk device, a hard disk device, an optical disk device, a tape device, a flash memory and/or other similar solid state memory device. In another embodiment, the storage device 906 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 904, the storage device 906, a memory coupled to the processor 902, and/or a propagated signal.

The high speed interface 908 may manage bandwidth-intensive operations for the generic computing device 900, while the low speed interface 912 may manage lower bandwidth-intensive operations. Such allocation of functions is exemplary only. In one embodiment, the high speed interface 908 may be coupled to the memory 904, the display unit 916 (e.g., through a graphics processor and/or an accelerator), and to the plurality of high speed expansion ports 910, which may accept various expansion cards.

In the embodiment, the low speed interface 912 may be coupled to the storage device 906 and the low speed bus 914. The low speed bus 914 may be comprised of a wired and/or wireless communication port (e.g., a Universal Serial Bus ("USB"), a Bluetooth® port, an Ethernet port, and/or a wireless Ethernet port). The low speed bus 914 may also be coupled to the scan unit 928, a printer 926, a keyboard, a mouse 924, and a networking device (e.g., a switch and/or a router) through a network adapter.

The generic computing device 900 may be implemented in a number of different forms, as shown in the figure. In one embodiment, the computing device 900 may be implemented as a standard server 918 and/or a group of such servers. In another embodiment, the generic computing device 900 may be implemented as part of a rack server system 922. In yet another embodiment, the generic computing device 900 may be implemented as a general computer 920 such as a laptop or desktop computer. Alternatively, a component from the generic computing device 900 may be combined with another component in a generic mobile computing device 930. In one or more embodiments, an entire system may be made up of a plurality of generic computing device 900 and/or a plurality of generic computing device 900 coupled to a plurality of generic mobile computing device 930.

In one embodiment, the generic mobile computing device 930 may include a mobile compatible processor 932, a mobile compatible memory 934, and an input/output device such as a mobile display 946, a communication interface 952, and a transceiver 938, among other components. The generic mobile computing device 930 may also be provided with a storage device, such as a microdrive or other device, to provide additional storage. In one embodiment, the components indicated heretofore are inter-coupled using various buses, and several of the components may be mounted on a common motherboard.

The mobile compatible processor 932 may execute instructions in the generic mobile computing device 930, including instructions stored in the mobile compatible memory 934. The mobile compatible processor 932 may be implemented as a chipset of chips that include separate and multiple analog and digital processors. The mobile compatible processor 932 may provide, for example, for coordination of the other components of the generic mobile computing device 930, such as control of user interfaces, applications run by the generic mobile computing device 930, and wireless communication by the generic mobile computing device 930.

The mobile compatible processor 932 may communicate with a user through the control interface 936 and the display interface 944 coupled to a mobile display 946. In one embodiment, the mobile display 946 may be a Thin-Film-Transistor Liquid Crystal Display ("TFT LCD"), an Organic Light Emitting Diode ("OLED") display, and another appropriate display technology. The display interface 944 may comprise appropriate circuitry for driving the mobile display 946 to present graphical and other information to a user. The control interface 936 may receive commands from a user and convert them for submission to the mobile compatible processor 932.

In addition, an external interface 942 may be provide in communication with the mobile compatible processor 932, so as to enable near area communication of the generic mobile computing device 930 with other devices. External interface 942 may provide, for example, for wired communication in some embodiments, or for wireless communication in other embodiments, and multiple interfaces may also be used.

The mobile compatible memory 934 may be coupled to the generic mobile computing device 930. The mobile compatible memory 934 may be implemented as a volatile memory and a non-volatile memory. The expansion memory 958 may also be coupled to the generic mobile computing device 930 through the expansion interface 956, which may comprise, for example, a Single In Line Memory Module ("SIMM") card interface. The expansion memory 958 may provide extra storage space for the generic mobile computing device 930, or may also store an application or other information for the generic mobile computing device 930.

Specifically, the expansion memory 958 may comprise instructions to carry out the processes described above. The expansion memory 958 may also comprise secure information. For example, the expansion memory 958 may be provided as a security module for the generic mobile computing device 930, and may be programmed with instructions that permit secure use of the generic mobile computing device 930. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 934, the expansion memory 958, a memory coupled to the mobile compatible processor 932, and a propagated signal that may be received, for example, over the transceiver 938 and/or the external interface 942.

The generic mobile computing device 930 may communicate wirelessly through the communication interface 952, which may be comprised of a digital signal processing circuitry. The communication interface 952 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 938 (e.g., radio-frequency transceiver). In addition, short-range communication may occur, such as using a Bluetooth®, Wi-Fi, and/or other such transceiver. In addition, a GPS ("Global Positioning System") receiver module 954 may provide additional navigation-related and location-related wireless data to the generic mobile computing device 930, which may be used as appropriate by a software application running on the generic mobile computing device 930.

The generic mobile computing device 930 may also communicate audibly using an audio codec 940, which may receive spoken information from a user and convert it to usable digital information. The audio codec 940 may likewise generate audible sound for a user, such as through a speaker (e.g., in a handset smartphone of the generic mobile computing device 930). Such a sound may comprise a sound from a voice telephone call, a recorded sound (e.g., a voice message, a music files, etc.) and may also include a sound generated by an application operating on the generic mobile computing device 930.

The generic mobile computing device 930 may be implemented in a number of different forms, as shown in the figure. In one embodiment, the generic mobile computing device 930 may be implemented as a smartphone 948. In another embodiment, the generic mobile computing device 930 may be implemented as a personal digital assistant ("PDA"). In yet another embodiment, the generic mobile computing device, 930 may be implemented as a tablet device 950.

An example embodiment will now be described. The ACME Haulage Corporation may provide cargo transportation services in remote areas of the United States. The ACME Haulage Corporation may be compensated based on a type of goods being carried inside a cargo area of its trailer of a transportation vehicle (e.g., a semi-trailer truck 104). For this reason, the ACME Haulage Corporation may want to understand the 'load' status of their equipment (e.g., a semi-trailer truck 104) to optimize the dispatch and routing of their transportation assets. In order to understand the load status of their equipment (e.g., a trailer 102), the ACME Haulage Corporation may have to rely on field reports. The ACME Haulage Corporation may have employed sensors (e.g. weight sensors, wave sensors, ultrasound sensors) in an interior space of its trailers. These sensors may not be able to detect patterns or types of cargo and exactly where in the trailer the cargo is located. The incorrect and unreliable cargo status provided by these sensors may have resulted into a number of untoward situations. For example, a driver of its semi-trailer truck may have embarked on a long journey, when, in fact, its cargo area is filled with the wrong type of cargo or may even be empty. This may have lead The ACME Haulage Corporation to a loss of invaluable time, fuel, efficiency, customer dissatisfaction, and/or ultimately, loss of revenue for its services.

To prevent these continuing losses, the ACME Haulage Corporation may have decided to invest in embodiments described herein (e.g., use of various embodiments of the FIGS. 1-9) for optimum utilization of interior spaces of the cargo area of its trailers (e.g., a trailer 102). The use of technologies described in various embodiments of the FIGS. 1-9 may enable the dispatch managers of ACME Haulage Corporation to remotely monitor and manage its entire fleets of cargo transport equipment (e.g., trailer 102) and asset utilization in real-time. The various embodiments of the FIGS. 1-9 may have also enabled the dispatch managers of the ACME Haulage Corporation to know the actual load status of its cargo transport equipment (e.g., a trailer 102) through image analysis and to verify the contents of the equipment through a photographic image. Additionally, the image analysis may have enabled the central dispatch (e.g., dispatcher 134) of the ACME Haulage Corporation to know what areas and/or zones of the equipment (e.g., trailer 102) are actually loaded.

The use of technologies described in various embodiments of the FIGS. 1-9 facilitated the dispatch managers (e.g., dispatcher 134) of ACME Haulage Corporation to utilize an easy-to-use mobile interface, giving it real-time visibility of the cargo areas of its trailers for their daily operations along with helping dispatch managers (e.g., dispatcher 134). The dispatch managers (e.g., dispatcher 134) of the ACME Haulage Corporation may now be able to automate manual business processes and optimize performance of its transportation equipments (e.g., trailer 102) by using the rich data platform as described in various embodiments of the FIGS. 1-9 maximizing trailer utilization.

The use of technologies described in various embodiments of the FIGS. 1-9 may have enabled trailer management system of the ACME Haulage Corporation to instantly connect dispatch managers to a host of powerful, easy-to-use analytics and insights via web-based, highly intuitive trailer tracking dashboards, customizable trailer tracking reports and exception-based alerts. Armed with this intelligence, dispatch managers (e.g., dispatcher 134) of the ACME Haulage Corporation may have the ability to automate yard checks; better manage and distribute trailer pools; improve detention billing; increase the efficiencies and productivity of dispatch operations; secure trailers and high-value cargo; deter fraud and unauthorized trailer use; improve driver and customer satisfaction; and maximize trailer utilization for a more profitable fleet. The ACME Haulage Corporation may now utilize their cargo area to its optimum capacity. This may have lead the ACME Haulage Corporation to save time, fuel, increase efficiency, customer satisfaction, and/or ultimately, prevent loss of revenue for its transportation services raising its profit.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse 924 by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. An apparatus for monitoring a cargo area within an interior cavity of a cargo transport trailer, the apparatus comprising:

a plurality of imaging devices distributed along a length of the interior cavity of the cargo transport trailer, each of the imaging devices having a field of view encompassing at least a portion of one or more projection areas of the cargo area, wherein each projection area comprises a portion of the cargo area within the interior cavity, the imaging devices positioned such that the field of view of one or more of the imaging devices overlaps a field of view of at least one adjacent imaging device within at least one of the projection areas, each imaging device operable to generate an image corresponding to its field of view;

one or more computer processors that are operable to receive the images generated by the plurality of imaging devices and execute instructions for processing data associated with the images, the instructions including:

instructions for processing an overlapping distortion present in one or more of the images in which the field of view of one imaging device overlaps the field of view of an adjacent imaging device, wherein the overlapping distortion provides information regarding the presence of cargo within the projection area in which the fields of view overlap;

instructions for determining, based on the overlapping distortion, a number of the projection areas in which cargo is present; and instructions for determining, based on the number of the projection areas in which cargo is present, a percent load value indicating a percentage of the cargo area of the interior cavity that contains cargo.

2. The apparatus of claim 1 further comprising:

one or more of the plurality of imaging devices operable to generate a reference baseline image of the cargo area when there is no cargo present within the interior cavity of the cargo transport trailer; and the one or more computer processors operable to receive the reference baseline image and execute instructions to compare the reference baseline image to images that were generated by the plurality of imaging devices subsequent to the generation of the reference baseline image, wherein the overlapping distortion is indicative of one or more differences between the reference baseline image and one or more of the subsequently generated images.

3. The apparatus of claim 1 wherein the plurality of imaging devices comprise X number of imaging devices distributed along the length of the interior cavity of the cargo transport trailer, and the one or more projection areas comprise X+1 number of projection areas distributed along the length of the cargo area, wherein each projection area encompasses 100/x+1 percent of the length of the cargo area.

4. The apparatus of claim 1 wherein the one or more computer processors are operable to execute instructions to activate the plurality of imaging devices to generate images of the cargo area upon an occurrence of a triggering event, wherein the triggering event comprises a trailer opening event, a trailer closing event, a motion detection event, a stopping event, a time based event, a geographic location based event, or a velocity based event.

5. The apparatus of claim 1 wherein the one or more computer processors are operable to execute instructions to activate the plurality of imaging devices to generate images of the cargo area upon an occurrence of a geographic location based event related to a location of the cargo transport trailer as determined by a geographic positioning receiver.

6. The apparatus of claim 1 further comprising a display device in electrical communication with the one or more computer processors for displaying at least the percent load value for viewing by an operator.

7. The apparatus of claim 6 wherein the display device is disposed in a cab of a truck that pulls the cargo transport trailer and is viewable by an operator of the truck.

8. The apparatus of claim 6 wherein the display device is connected to a dispatch server computer and is viewable by a dispatcher at a location that is remote from the cargo transport trailer.

9. The apparatus of claim 1 wherein at least one of the one or more computer processors is disposed in or on the cargo transport trailer.

10. The apparatus of claim 1 wherein at least one computer processor of the one or more computer processors is a component of a dispatch server computer disposed at a location that is remote from the cargo transport trailer.

11. The apparatus of claim 10 wherein the at least one computer processor executes instructions to generate graphical information for simultaneously showing percent load values for multiple cargo transport trailers for display on a display device for viewing by a dispatcher.

12. A method for monitoring a cargo area within an interior cavity of a cargo transport trailer, the method comprising:
(a) activating a plurality of imaging devices distributed along a length of the interior cavity of the cargo transport trailer to generate a plurality of images of a cargo area within the interior cavity, wherein each of the imaging devices has a field of view encompassing at least a portion of one or more projection areas of the cargo area, wherein each projection area comprises a portion of the cargo area within the interior cavity, wherein the imaging devices are positioned such that the field of view of one or more of the imaging devices overlaps a field of view of at least one adjacent imaging device within at least one of the projection areas;
(b) detecting an overlapping distortion present in one or more of the images in which the field of view of one imaging device overlaps the field of view of an adjacent imaging device, wherein the overlapping distortion provides information regarding the presence of cargo within the projection area in which the fields of view overlap;
(c) determining, based on the overlapping distortion, a number of the projection areas in which cargo is present; and
(d) determining, based on the number of the projection areas in which cargo is present, a percent load value indicating a percentage of the cargo area of the interior cavity that contains cargo.

13. The method of claim 12 further comprising:
(e) prior to step (a), generating a reference baseline image of the cargo area when there is no cargo present within the interior cavity of the cargo transport trailer; and
(f) comparing the reference baseline image to one or more of the images generated in step (a), wherein the overlapping distortion is indicative of one or more differences between the reference baseline image and one or more of the images generated in step (a).

14. The method of claim 12 wherein the plurality of images are generated using X number of imaging devices distributed along the length of the interior cavity of the cargo transport trailer, wherein the one or more projection areas comprise X+1 number of projection areas distributed along the length of the cargo area, wherein each projection area encompasses 100/x+1 percent of the length of the cargo area.

15. The method of claim 12 wherein step (a) is initiated based on an occurrence of a triggering event, wherein the triggering event comprises a trailer opening event, a trailer closing event, a motion detection event, a stopping event, a time based event, a geographic location based event, or a velocity based event.

16. The method of claim 12 wherein step (a) is initiated based on an occurrence of a geographic location based event related to a location of the cargo transport trailer as determined by a geographic positioning receiver.

17. The method claim 12 further comprising providing at least the percent load value to a display device for viewing by an operator.

18. The method of claim 17 wherein the display device is disposed in a cab of a truck that pulls the cargo transport trailer and is viewable by an operator of the truck.

19. The method of claim 17 wherein the display device is connected to a dispatch server computer and is viewable by a dispatcher at a location that is remote from the cargo transport trailer.

20. The method of claim 19 further comprising providing graphical information to the display device for simultaneously showing percent load values for multiple cargo transport trailers for viewing by the dispatcher.

21. The method of claim 12 wherein one or more of steps (b), (c) and (d) are performed by one or more computer processors disposed in or on the cargo transport trailer.

22. The method of claim 12 wherein one or more of steps (b), (c) and (d) are performed by one or more computer processors that are components of a dispatch server computer disposed at a location remote from the cargo transport trailer.

* * * * *